United States Patent [19]

Comperatore et al.

[11] 4,229,201
[45] Oct. 21, 1980

[54] APPARATUS FOR BENDING GLASS SHEETS TO COMPLICATED CURVATURES USING LOCALIZED SUPPLEMENTARY HEATING

[75] Inventors: John A. Comperatore, Natrona Heights; Edward D. Black, Brackenridge; David J. Wise, New Kensington, all of Pa.

[73] Assignee: PPG Industries, Inc., Pittsburgh, Pa.

[21] Appl. No.: 25,137

[22] Filed: Mar. 29, 1979

[51] Int. Cl.² ............................................. C03B 23/02
[52] U.S. Cl. ....................................... 65/287; 65/273; 65/290
[58] Field of Search ................. 65/106, 107, 273, 275, 65/282, 290

[56] References Cited

U.S. PATENT DOCUMENTS

| 682,571 | 9/1901 | Sage | 65/287 |
|---|---|---|---|
| 2,377,849 | 6/1945 | Binkert et al. | 65/103 |
| 2,897,632 | 8/1959 | Fowler et al. | 65/288 |
| 2,967,378 | 1/1961 | Jones et al. | 65/107 |
| 2,999,338 | 9/1961 | Richardson | 65/289 X |
| 3,069,877 | 12/1962 | Golightly | 65/103 |
| 3,114,571 | 12/1963 | Carson et al. | 296/84 |
| 3,264,082 | 8/1966 | Golightly | 65/288 |
| 3,293,020 | 12/1966 | Sleighter | 65/111 |
| 3,333,935 | 8/1967 | Valchar et al. | 65/106 |
| 3,340,037 | 9/1967 | Stevenson | 65/107 X |
| 3,348,935 | 10/1967 | Carson et al. | 65/103 |
| 3,356,480 | 12/1967 | Golightly | 65/103 |
| 3,560,182 | 2/1971 | Golightly | 65/107 |
| 3,560,183 | 2/1971 | Stilley et al. | 65/107 |
| 3,607,186 | 9/1971 | Bognar | 65/104 |
| 3,632,326 | 1/1972 | Ritter, Jr. | 65/106 |
| 3,918,948 | 11/1975 | Monzi | 65/106 X |
| 4,043,785 | 8/1977 | Reese | 65/107 |
| 4,047,916 | 9/1977 | Reese et al. | 65/106 |
| 4,072,493 | 2/1978 | Imler | 65/107 |
| 4,074,996 | 2/1978 | Hagedorn et al. | 65/106 |
| 4,077,791 | 3/1978 | Oelke | 65/273 |
| 4,119,425 | 10/1978 | Marriott | 65/107 |

Primary Examiner—Arthur D. Kellogg
Attorney, Agent, or Firm—Dennis G. Millman; Edward I. Mates

[57] ABSTRACT

Apparatus for shaping a glass sheet to a complicated shape including a pair of sharply bent areas extending across its transverse dimension and a substantially spherically sagged portion intermediate the areas of sharp bending.

10 Claims, 6 Drawing Figures

SEQUENCE OF OPERATION STEPS

1. Mount flat glass sheet on open mold.

2. Insert mold supporting flat glass sheet in kiln.

3. Heat kiln to uniform temperature.

4. Apply intensive heat downward toward areas of sharp bending, while continuing kiln heat.

5. Discontinue downward intensive heat when sharp bends are formed, while continuing kiln heat.

6. Apply upward heat to intermediate region of glass sheet while continuing kiln heat until desired cross-sag is obtained.

7. Controllably cool kiln environment.

8. Remove mold with bent glass sheet from kiln.

9. Remove bent glass sheet from mold.

FIG. 6

APPARATUS FOR BENDING GLASS SHEETS TO COMPLICATED CURVATURES USING LOCALIZED SUPPLEMENTARY HEATING

BACKGROUND OF THE INVENTION

1. Field of the Invention

The present invention relates to shaping glass sheets into complicated shapes incorporating two sharp lines of bending that extend completely across a dimension of the bent glass sheet and a sagged portion intermediate said pair of sharply bent areas. Such complicated bends are necessary in the formation of glass press polishing molds used for press polishing sheets of plastic such as polycarbonate and/or acrylic resin plastics that are components of lightweight aircraft transparences and which require very smooth surfaces in order to provide optical properties that do not tire the eyes of a pilot of aircraft in which the plastic transparency is installed. It is also necessary that the glass sheets conform exactly to the shape required for the plastic transparencies to fit within the frame in which the ultimate aircraft transparency is mounted.

Glass sheets shaped by the method recited herein are shaped to provide conforming surfaces that simultaneously press polish the opposite surfaces of the plastic to be press polished as part of the fabrication process for the plastic transparency. It is very difficult to shape a glass sheet by a gravity sag bending technique without causing the sheet to sag without control, particularly in the central portion which is unsupported by an outline ring mold. When a glass sheet is sagged to conform throughout its extent to a continuous shaping surface provided by a continuous mold, the glass on contacting the mold shaping surface while heat-softened develops all of the defects that result from contacting dust particles or any irregularties on the mold shaping surface. In an effort to shape glass sheets to an exact shape throughout their extent, glass sheets have been press bent using pressing molds that engage one or both of the opposite major glass sheet surfaces to provide an exact shaping surface to which the glass sheet is to be conformed. The art has developed covers or protective blankets of fiber glass or other fibrous material, which, unfortunately, have a pattern which is likely to be imprinted on the surface of the heat-softened glass when pressurized contact is made in the vision area. The necessity for a closely conforming shape throughout the entire extent of the glass sheet to the desired shape without surface marking has brought about a need to effectively control the amount of shape imparted to a glass sheet bent to a complex shape while supported on its periphery only on an outline mold.

In the past, electric heating elements have been used in conjunction with overall heat within an enclosed hot atmosphere to provide a sharp bend between adjacent areas that are essentially flat. It has also been known to avoid too much disparity in heat between the top and bottom surfaces in order to avoiding bowing the glass sheet convexly with respect to the remainder of the sheet while using top heat.

All of the above problems have made it very difficult to shape glass sheets to complicated shapes involving a pair of sharply bent areas extending across the width of the shaped sheet and a controlled sag of essentially spherical configuration in the glass sheet region intermediate the sharply bent areas.

2. Description of the Prior Art

U.S. Pat. No. 3,293,020 to Sleighter discloses a method of heating glass sheets supported on a mold and heated simultaneously from above and below by means of heating elements located within a tunnel-like lehr for heating the supported glass sheets into the shape of the mold.

U.S. Pat. No. 2,967,378 to Jones and Black discloses a method and apparatus for bending glass sheets to compound shapes by subjecting them to different heat patterns, first of the general heat type to heat the entire surface to a uniform temperature, followed by treatment with localized intense heat. Both heat treatments are applied from above.

U.S. Pat. No. 2,377,849 to Binkert and Jendrisak discloses a process for bending glass sheets using a multiple step and multiple mold arrangement. Initially, the glass sheets are sagged by gravity into a mold of concave elevation and the bend is completed by applying suction to complete the bend. This patent also discloses shaping glass sheets to compound curvature by providing initial bending by gravity sagging over a ring mold to form a regular spherical bend, followed by removing the pre-bent sheets from the mold, cutting sections of the desired outline from the sheets and then placing the pre-bent cut sheets upon a second mold provided with a concave bending surface conforming to the final shape to be given the glass sheets. The second bend is assisted by suction.

U.S. Pat. No. 2,999,338 to Richardson discloses an outline mold for shaping glass sheets by gravity sagging to a compound bend wherein a heating element 30 is pivotally mounted over a central region of sagging and a pair of transversely extending heaters 24 located beneath transverse elongated areas of sharp bending. In addition, this patent discloses a sag bending indicator. The pivotally mounted central heater would be difficult to pivot downward if the end portions of the glass were bent to extend approximately normal to the central portion thereof. Furthermore, the central portion of the glass sags away from an overhead heater, thereby reducing the effectiveness of the central heater associated with the mold.

U.S. Pat. Nos. 682,571 to Sage; 3,560,182 to Golightly; 3,560,183 to Stilley et al and 3,607,186 to Bognar disclose the use of sloped supports disposed around the periphery of a mold that provides sliding support for the margin of a glass sheet that sags to conform to a mold shaping surface.

U.S. Pat. No. 3,069,877 and others to Golightly disclose an outline, sectionalized mold having a sloped enlongated shaping rail that supports a longitudinal side edge of a glass sheet being bent into a bend comprising a pair of sharply bent areas extending across the glass sheet and a longitudinally extending elongated area that forms a longitudinally extending side edge portion bent relative to the remainder of a glass sheet about an axis of bending that extends longitudinally of the sheet.

U.S. Pat. No. 3,356,480 to Golightly discloses the formation of a compound bend which includes two lines of bending across the transverse dimension of a glass sheet and a side portion bent about an axis extending longitudinally of the glass sheet and to one side of the longitudinal center line thereof. The glass is bent on a sectionalized mold and while still supported on the mold, is irradiated from above to provide the transverse bend about the axis extending longitudinally of the glass sheets. This patent also shows an embodiment comprising an elongated slide sloped transversely of its length to one side only of the outline old shaping surface.

U.S. Pat. No. 4,072,493 to Imler discloses an outline bending mold for shaping one or more glass sheets by gravity sag bending including one or more sharp bends by combining overall heating and localized heating using one or more electroconductive heating ribbons and guiding means to locate the ribbons below the shaping surface of a sectionalized mold in positions which would not interfere with loading or unloading glass sheets on the mold. The shapes developed by Imler are sharp bends between relatively flat glass sheet portions.

Other patents cited during novelty searches of the subject matter of this invention include U.S. Pat. No. 2,897,632 to Fowler and Dunipace which shows a sectionalized, outline mold, U.S. Pat. No. 3,114,571 to Carson and Leflet which shows a cap windshield, U.S. Pat. No. 3,264,082 to Golightly which shows a sectionalized, outline mold, U.S. Pat. No. 3,333,935 to Valchar and Mrozinski which shows local heating to effect a sharp bend in press bent glass, U.S. Pat. No. 3,348,935 to Carson and Leflet which shows various sectionalized, outline molds, U.S. Pat. No. 3,632,326 to Ritter which relates to warping glass by differential cooling followed by inertia sag bending and U.S. Pat. No. 3,918,948 to Monzi which discloses means to maintain glass sheets in alignment.

In addition, the following patents were cited as of interest in the disclosure of the formation of sharp lines of bending. These include U.S. Pat. No. 3,340,037 to Stevenson, which discloses pivoted blast guides which are used in conjunction with burners for providing oblique lines of sharp bending at an angle to the direction of glass sheet movement through a bending lehr, U.S. Pat. No. 4,043,785 to Reese, which discloses a manner of forming a sharp line of bending using an electroconductive ribbon, U.S. Pat. No. 4,047,916 to Reese, Mortimer, Tobin and Jursa, which shows the employment of weighted ribbons for forming a double V-bend on glass sheets supported on outline molds, U.S. Pat. No. 4,074,996 to Hagedorn, Rahrig and Revells, which discloses apparatus for forming sharp bends that includes a sectionalized primary press bending member having articulated end sections for sharply bending portions of the glass sheet about lines superheated by a radiant energy heat source located above the primary press member and further provided with clamping devices and a supplementary press member with a complemental shaping surface for pressing the glass end portions sharply relative to the main portion of the glass sheet, U.S. Pat. No. 4,077,791 to Oelke, which discloses a mold for forming relatively sharp angled bends and particularly discloses a special contacting member to insure good electrical contact between a source of electrical power and the heating element used to provide the intense heat to improve the sharpness of bend, and U.S. Pat. No. 4,119,425 to Marriott, which discloses a window formed of a glass sheet having a combined electric heating circuit and bending circuit imprinted thereon. The bending circuit includes resistance elements in the form of an electrically conducting path extending transversely of the sheet along the lines about which a sheet is to be bent sharply.

The glass sheet shapes developed by the prior art either required elongated areas of bend between relatively flat portions shaped about sharp axes of bending relative to one another or, in the case of precision formed compound bends, involved the sagging of the glass sheet onto an upward facing shaping surface of continuous or substantially continuous contour conforming to the ultimate shape desired. The prior art has failed to develop a technique that would avoid the harm to the bottom surface of a glass sheet bent to conform to a supporting surface of the proper shape in both longitudinal and transverse directions in the central portion of a glass sheet between transversely extending areas bent to comparatively sharp bends.

The prior art required a technique to enable one to bend a glass sheet into a shape comprising a pair of elongated areas of sharp bending extending across the transverse dimension of the sheet combined with an area of controlled spherical sagging in the central portion of the sheet intermediate the transversely extending areas of sharp bending.

SUMMARY OF THE INVENTION

The present invention provides apparatus for bending a glass sheet into a complicated shape involving a pair of transversely extending areas of sharp bending extending across the width of the bent sheet and an intermediate area of controlled spherical sagging intermediate the two longitudinally extending areas of sharp bending. In a particularly desirable apparatus for performing the present invention, a pair of transversely extending heating elements are used with a sectionalized, outline mold which supports the glass sheet for its compound shaping and has end mold rails of end mold sections pivoted relative to a support structure for a pair of longitudinally extending shaping rails forming a main central section of the mold to provide an upward lifting force longitudinally outward of transversely extending elongated areas of intensive heating developed by said transversely extending heating elements. An auxiliary electrical heater is supported below the outline mold in the region intermediate the lines of sharp bending to provide a heat source from a circular area of heat source support that is actuated to provide the desired central area of sag of controlled depth and extent only after the glass sheet has bent sharply to sag into close proximity to said circular area of heat source support. All four rails of the sectionalized mold have an upward facing surface of considerable width that slopes downward and inward toward the interior of the mold to provide sliding support for a glass sheet to be shaped into a complicated shape. Each end portion of the glass sheet is free to slide on the oblique supports of the end mold sections and each side edge of the glass is free to slide inward on both center section shaping rails to help develop a spherical-type sag in its central area portion.

The benefits of the present invention will be understood better in the light of a description of an illustrative embodiment which follows.

BRIEF DESCRIPTION OF THE DRAWINGS

In the drawings which form part of a description of a preferred illustrative embodiment and wherein like reference numbers refer to like structural elements.

FIG. 6 is a list of sequence of operational steps performed by the method conforming to the present invention.

DESCRIPTION OF THE PREFERRED EMBODIMENTS

Figure 1:
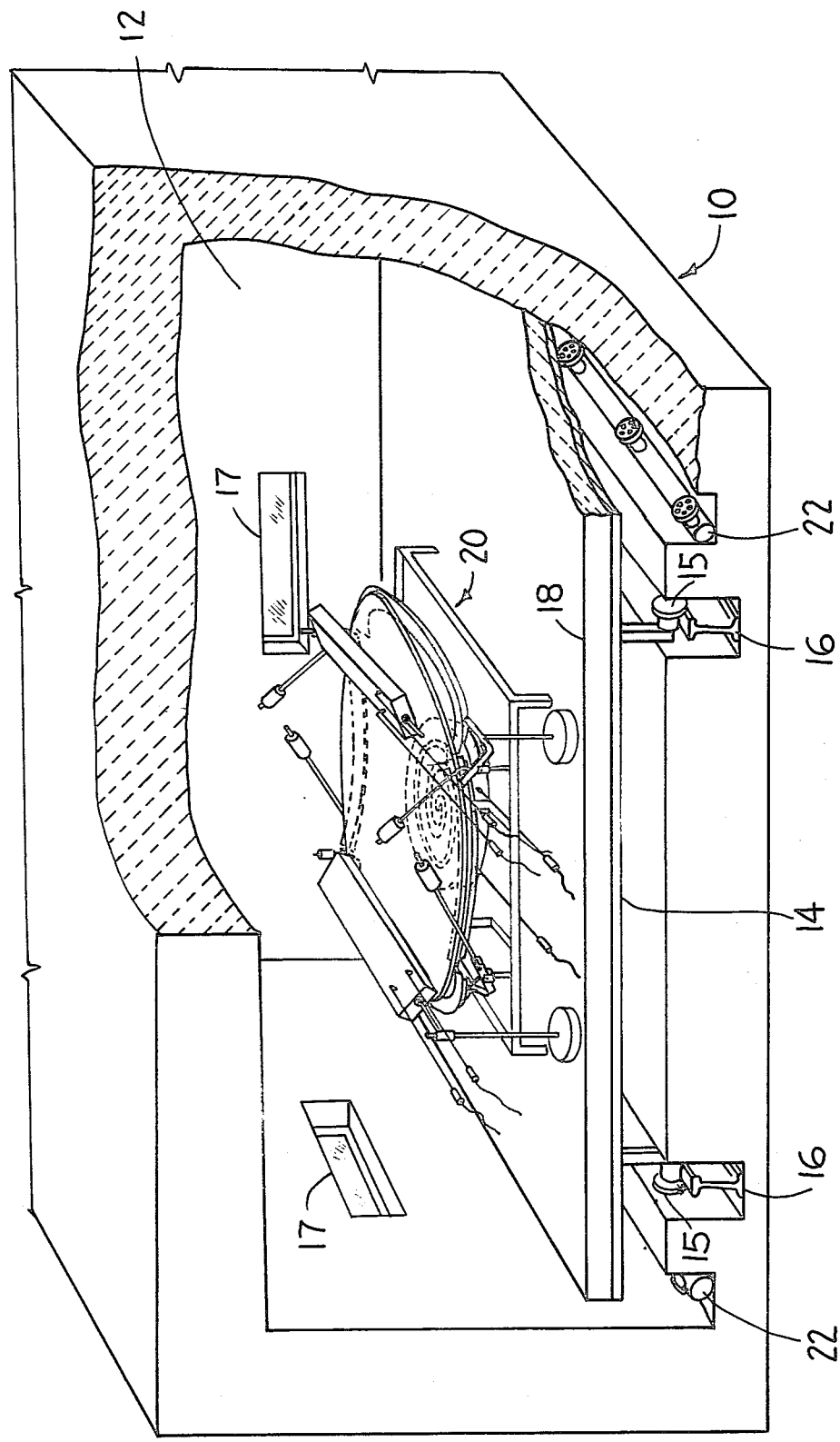
FIG. 1 is a perspective view of an outline bending mold of the type conforming to the present invention shown mounted within a bending kiln with a glass sheet supported thereon for bending.
Figure 2:
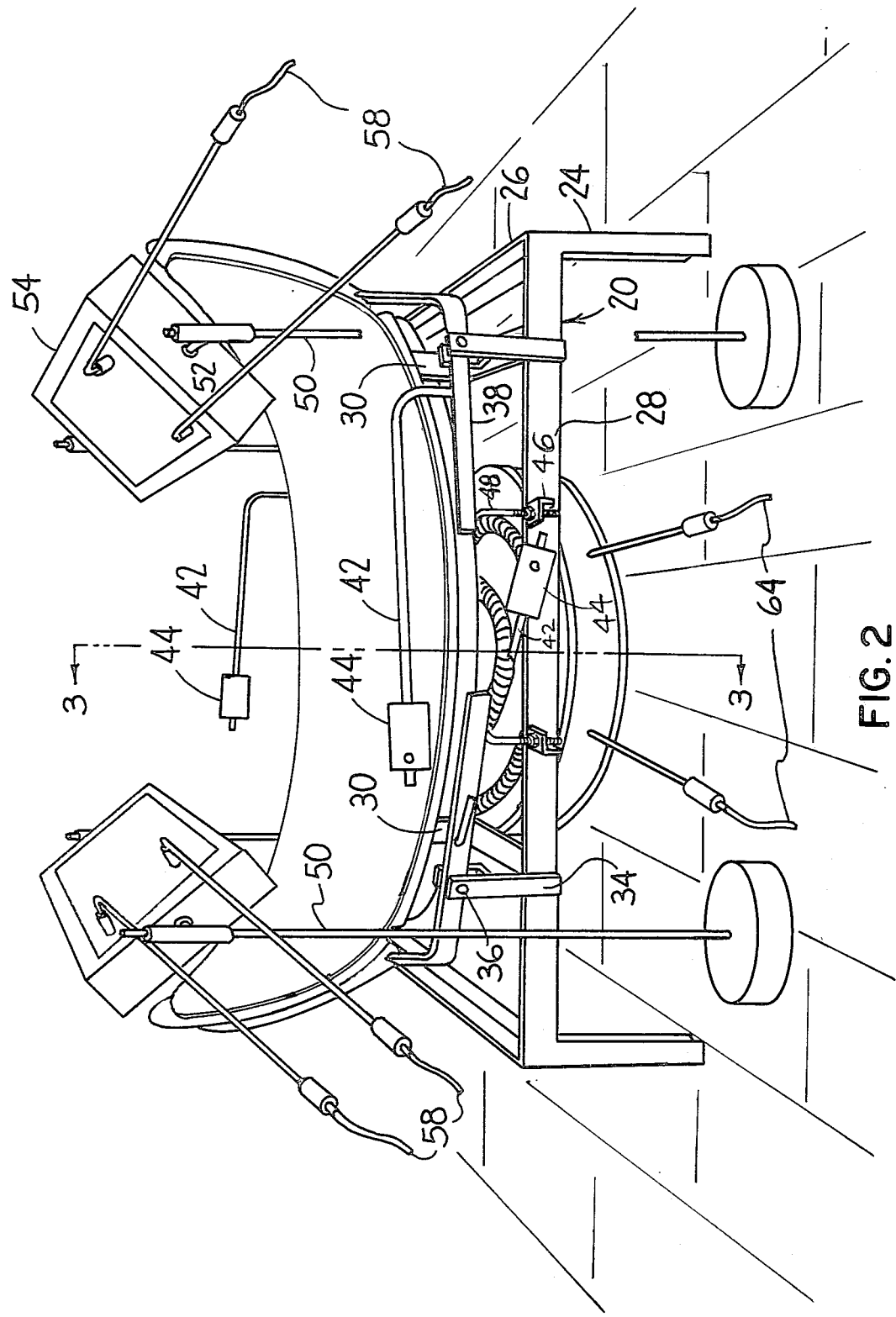
FIG. 2 is an enlarged view similar to that of FIG. 1 showing the glass sheet conforming to the shape of the outline mold in an intermediate portion of the bend.

The illustrative embodiment of the present invention provides a flat glass sheet of non-rectangular outline 55 inches (140 cm) long and 40 inches (102 cm) wide with a shape having a pair of sharply bent transversely extending areas that are bent to a depth of approximately 10 inches (25 cm) below the ends of the glass sheet and an additional compound sag of 3 inches (8 cm) between the pair of sharply bent transversely extending areas and between the side edges of the bent sheet. The chord length of the bent glass sheet is reduced to about 44 inches (112 cm) and the width of the bent glass sheet is reduced to about 38 inches (97 cm) as a result of the complicated shape imparted thereto.

With reference to the drawings, FIG. 1 shows a mold conforming to the present invention in a spread position capable of receiving a flat glass sheet precut to its ultimate non-rectangular outline to be bent within a bending kiln 10. Kiln 10 is preferably of the type depicted in U.S. Pat. No. 4,119,424 to John A. Comperatore and comprises an enclosed chamber 12 of generally rectangular configuration formed by side walls, floor and roof. A carriage 14 is provided with wheels 15 for movement from outside the kiln 10 to within the kiln on rails 16 through an entrance door (not shown). The kiln is provided with windows 17 to enable an operator to observe the progress of a shaping operation.

The carriage 14 is provided with an upper layer of refractory material 18 for supporting a mold support structure 20. The rectangular chamber 12 is heated by a pair of hot gas supply pipes 22 (FIG. 1) which provide hot gas within the rectangular chamber in a manner well known in the art to provide the desired elevated temperature for the ambient surroundings for the mold support structure 20.

The details of the mold structure are depicted more clearly in FIGS. 2 to 5 and the structure 20 comprises a supporting frame comprising upstanding angle bars forming legs 24 interconnected by cross bars 26 extending across the transverse dimension of a resulting frame and longitudinally extending bars 28 extending across the lengthwise dimension of the resulting support frame. A pair of L-shaped straps 30 (see also FIGS. 3 and 4) extend inward and upward from the front longitudinally extending bar 28 whereas a pair of obliquely extending straps 31 extend upward and inward from the rear longitudinally extending bar. Each of the straps is rigidly connected to a longitudinal shaping rail 32 of a sectionalized mold to be described later.

Each longitudinal shaping rail 32 is of modified T in cross-section and has a head portion and a stem portion. The latter is rigidly connected to one or the other longitudinally extending bar 28 through straps 30 or 31. The head portion has an upper shaping surface that conforms in longitudinal elevation and in plan to the shape desired along one or the other longitudinal edges of the glass sheet slidable supported thereon. The upper shaping surface of the head portion is tilted inwardly and downwardly transversely of the length of the shaping rail 32 to provide an obliquely extending glass edge supporting surface whose angle of obliquity is relatively large at its longitudinal extremities and decreases gradually toward its center portion. The rails 32 form longitudinal side edges of an outline shaping mold of the gravity sag type and are of concave elevation along their length.

Each of the longitudinally extending bars 28 of the supporting frame supports an upwardly extending hinge bracket 34. The latter includes a hinge member 36 about which an L-shaped outrigger 38 is pivoted. The outrigger has a transversely extending arm attached to one of a pair of end mold sections 40. Each end mold section 40 is of modified T cross-section similar to that of the shaping rails 32 of the center mold section, and comprises a head portion and a stem portion. The stem portion of each end mold section 40 is directly connected to a pair of transversely extending arms of a pair of laterally opposite outriggers. The head portions of the end mold sections 40 are provided with upper shaping surfaces that are tilted inwardly and downwardly toward a mold opening enclosed on its longitudinal sides by shaping rails 32 and on its end portions by the end mold sections 40. The upward facing surfaces of the head portions of the end mold sections 40 provide the end portions of a frame-like glass sheet supporting surface whose angle of obliquity increases gradually from their inner ends where the tilt approximately equals that of the ends of rails 28 and increases outwardly therefrom. Each end mold rail is shaped in plan outline and elevation (except for the graduation in obliquity) to conform to the shape and outline of one or the other end portions of the shaped glass sheet.

The longitudinally extending arm of the outrigger 38 is pivoted to the hinge member 36 and has a rod 42 counterweighted at 44 attached thereto longitudinally inwardly of the hinge member 36 so as to provide a rotational force that tends to pivot its attached end mold rail 40 relative to the hinge members 36 in an upwardly folded relation with respect to rails 28 to form a continuous frame of elevational shape and plan outline that conforms to the shape of the glass outline. Each rod 42 is shaped in such a manner that it does not interfere with the rotation of the other rod mounted to the same side rail on the counterweight 44 attached thereto, as shown best in FIG. 5.

Each longitudinally extending bar 28 has attached to its outer surface an extension 46 on which is mounted an externally threaded stop member 48 of L-shaped configuration for vertical adjustment relative to the extension 46. Each stop member is in position to be engaged by the longitudinally inner end portion of the longitudinal arm of the corresponding outrigger 38 inward of the hinge member 36 so as to limit the rotation of the outrigger, and hence, that of the end mold section 40 so that the end mold sections 40, when pivoted to a closed position, cooperate with the rigidly supported longitudinal shaping rails 32 to provide an essentially continuous outline frame having obliquely downward and inwardly tilted glass supporting surfaces of considerable width and of gradually increasing obliquity from center to each end for supporting a glass sheet of non-rectangular outline thereon. The tilted upward facing surfaces of the end mold sections 40 and the longitudinal shaping rails 32 conform in elevation and outline to the shape desired for the periphery of a glass sheet to be bent and support the margin of the glass for both longitudinal and transverse sliding as a complicated bend develops.

A pair of vertical stands 50 is mounted on each side of the mold structure 20 in transversely opposing sets. Each transversely opposing set is provided with inwardly extending horizontal arms 52 that support the ends of a ceramic holder 54 for electroconductive heating elements 56. Lead lines 58 are provided to connect the electroconductive heating elements 56 with a voltage source (not shown).

Below the central portion of the mold structure 20 and intermediate the shaping rails 32, a ceramic holder 60 of circular area is provided. The holder provides means for supporting an additional heating element in the form of a spirally wound resistance heating coil 62, which is connected independently of the heating elements 56 to a voltage source (not shown) through additional lead lines 64.

Typical heating elements 56 for the ceramic holder 54 comprise four rows of series connected resistance coils (100 coils to a row) of number 12 nichrome wire turned at 2½ turns per inch (1 inch per centimeter) on ½ inch (12.7 millimeters) rods supported 6 inches (15 centimeters) above the glass to irradiate an area approximately 6 inches (15 centimeters) wide and 39 inches (99 centimeters) long. The resistance wire 62 mounted in the ceramic holder 60 is number 11 nichrome V wire 66 feet (20 meters) long wound on a three-quarter inch (1.9 cm) rod, 2½ turns per inch (1 turn per centimeter) to provide an area of 17 inches (55 cm) in diameter supported on a ceramic holder 60 that is 20 inches (55 cm) in diameter. Adjacent lines of the heating elements 56 are approximately 1½ inches (3.8 cm) apart.

Figure 3:
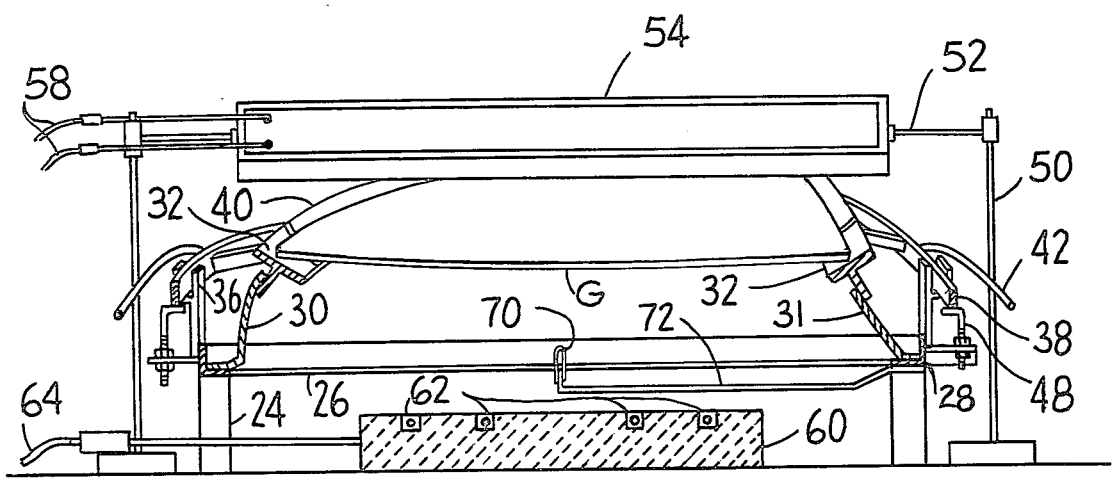
FIG. 3 is a sectional view of the mold taken along the lines 3—3 of FIG. 2 showing the glass sheet in its intermediate shape.
Figure 4:
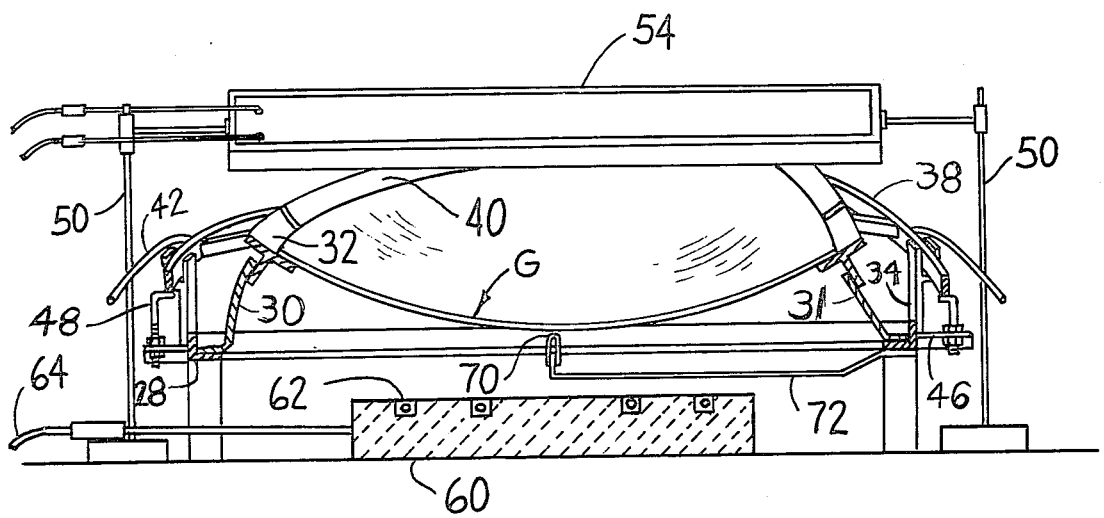
FIG. 4 is a view similar to that of FIG. 3 and showing how the glass sheet completes its spherical sag and thereby completes its complicated shape.
Figure 5:
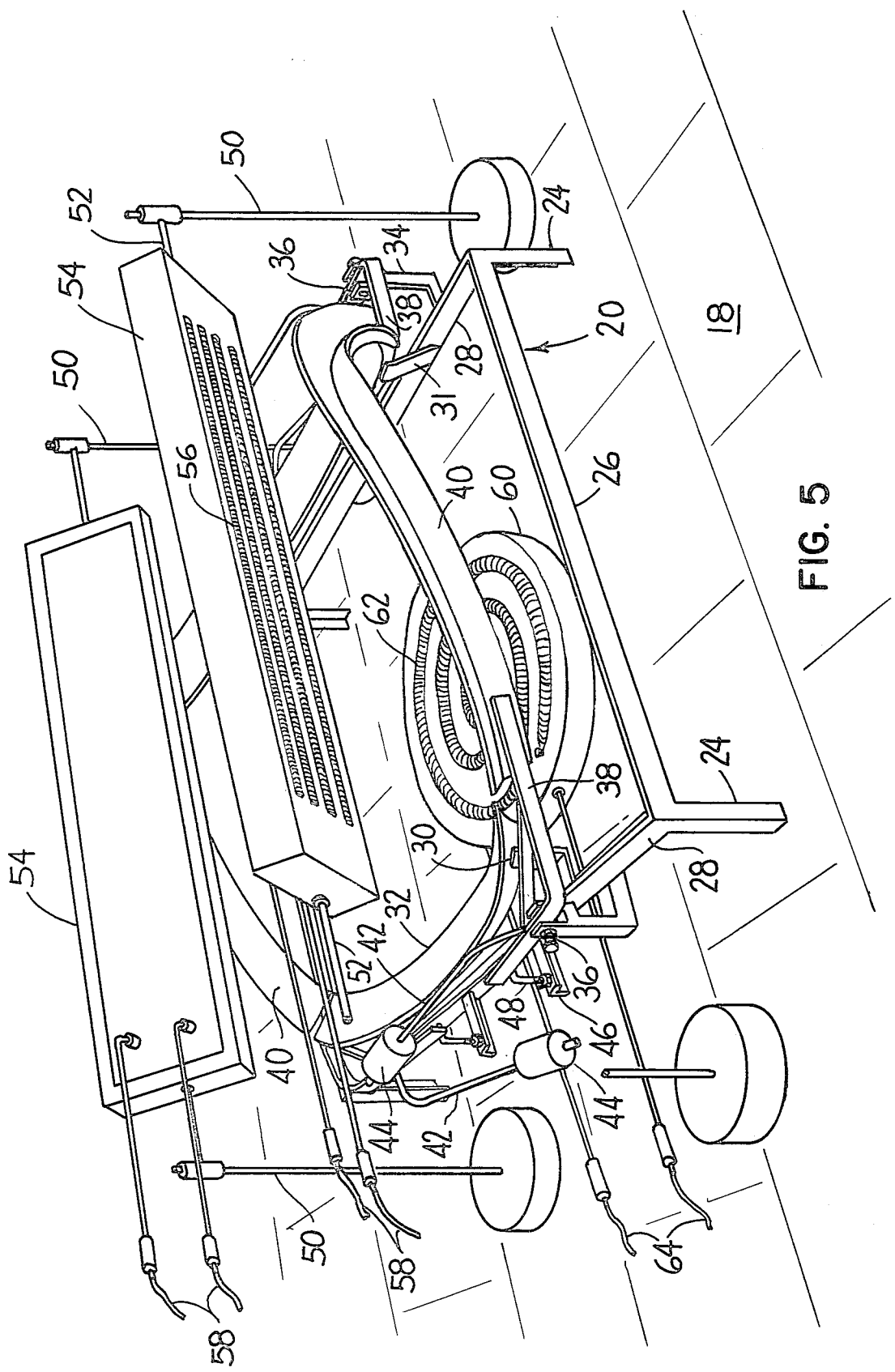
FIG. 5 is a perspective end view of the apparatus depicted in FIGS. 1 to 4.

In order to help monitor the spherical sagging, a sag indicator 70 is provided comprising a closed fiber glass sleeve mounted on an upward end portion of an elongated wire 72. The sag indicator is located so that the closed end of its fiber glass sleeve is located in position immediately below the elevation reached by the lower surface of the glass sheet when the latter is sagged a desired amount by heat from the circular area of heating element 60. The wire 72 connects the sag indicator to a longitudinally extending rail 26. FIG. 3 shows the relative position of the sag indicator 70 to the central area region of the glass sheet after completion of the prebending step when the glass sheet is bent sharply below the heating elements 56, and FIG. 4 shows how the central area region of the glass sheet has sagged into close adjacency just short of contact with the sag indicator 70 at the end of the second stage of bending.

In a typical operation, the mold structure 20 is mounted on the center of the carriage 14 with the ceramic holder 60 disposed centrally of the mold. The shaping surfaces of the mold are 4 inches (10 cm) wide and tilt obliquely downward and inward at angles transversely to the rail lengths that decrease from about 20 degrees at the outer ends of the end mold sections 40 to about 15 degrees at the center of the shaping rails 32. The flat glass sheet ¼ inch (6 mm) thick, 55 inches (140 cm) long, and 40 inches (102 cm) wide to be shaped is mounted in symmetrical relationship to the outline mold with its longitudinal end portions resting on the downwardly and inwardly tilted upward facing surfaces of the end mold sections 40 which are pivoted downward and outward to a plane that intersects the ends of the surfaces of the longitudinal shaping rails 32 so that the ends of the latter also support the flat sheet of glass. The vertical stands 50 and arms 52 are adjusted in positions flanking the mold structure so that the ceramic holders 54 face the transversely extending areas to be bent sharply and the carriage 14 is inserted in the kiln 10 so that the glass is approximately at the geometric center of the kiln and the kiln door is closed.

The kiln is heated for about 2 hours to develop a temperature of 1120° F. (604° C.). When this temperature has been attained, the heating elements 56 are energized at a voltage of 220 volts d.c. to supply 21 amperes of current to the heating elements. This kiln heating is continued with the increased localized electrical heating for approximately 30 minutes or until the end mold sections 40 are folded into the positions depicted in FIGS. 2 and 5, and the glass sheet folds in two transversely extending areas to form a prebent sheet resting along the length of rails 28 and end mold sections 40. A look at FIG. 3 discloses how the glass sheet G has been hardly sagged in its transverse dimension, even though the longitudinal ends of the glass sheet are about 10 inches (25 cm) higher than the line of sharp transverse bending. Upon completion of the sharp bends, the glass sheet has slid downward somewhat from its original rest places on the outer ends of the end mold sections 40 but most of the shortening of the chord length is due to the upward pivoting of the end mold sections 40 in response to the softening of the areas facing the heating elements 56 to fold the ends of the glass sheet upward relative to its central portion. The outriggers 38 contact the stop members 48 when the mold reaches its closed mold position conforming to the longitudinal elevational shape of the curved glass sheet.

The central portion of the glass sheet is directly over the ceramic holder of circular area 60. At this time, current to the heating elements 56 is stopped by disconnecting the electrical voltage source and voltage is applied to the resistance wire 62 at a voltage of 210 volts d.c. to provide a current of 27 amperes. Because of the circular nature of the radiant source area from which the auxiliary electric heating is applied, the glass sheet sags transversely and longitudinally fairly uniformly to give a spherical contour of the desired sagged shape to the central portion of the glass. About 15 to 20 minutes of additional heating at this rate is needed to obtain the desired sagging of 3 inches. Sagging is gradual and uniform in all directions because of the circular structure of the ceramic holder 60. Heating is stopped when the operator observes the sagged central portion of the complexly shaped glass sheet approach to almost touch the upper end of the sag indicator. At this moment, power to the resistance wire 62 is discontinued and the kiln allowed to cool gradually.

The particular operations described hereinabove are for a glass composition having the following ingredients:

| Ingredients | Percent by Weight |
| --- | --- |
| $SiO_2$ | 59–62 (preferably 62) |
| $Al_2O_3$ | 18–23 (preferably 20.1) |
| $Li_2O$ | 4–5.5 (preferably 4.8) |
| $Na_2O$ | 7–9 (preferably 7.9) |
| $B_2O_3$ | 3–5 (preferably 4.6) |
| Cl | 0.5 |
| $As_2O_5$ | 0.1 |

This preferred composition has the following properties:

| | |
|---|---|
| Liquidous temperature | 1855° F. (1013° C.) |
| Strain point (viscosity $4 \times 10^{14}$ poises) | 860° F. (460° C.) |
| Annealing point (viscosity $2.5 \times 10^{13}$ poises) | 930° F. (499° C.) |
| Log 4 viscosity temperature | 1925° F. (1053° C.) |
| Log 3.5 viscosity temperature | 2300° F. (1260° C.) |

The glass composition selected was one that had a relatively low softening point so that it would conform readily to a desired shape when subjected to a controlled heat cycle. Another reason for selecting this glass composition is that the glass composition can be chemically tempered by ion exchanging for 270 minutes in sodium nitrate at a temperature in the range of 750° to 760° F. (399° to 404° C.). Such chemical tempering strengthens the shaped glass sheet without modifying its shape.

To the best of our knowledge, the present invention has utilized auxiliary electric heat in conjunction with an outline skeleton mold of sectionalized construction having shaping rails with tilted shaping surfaces to provide a complicated shape comprising a centrally disposed region of substantially uniform spherical sagging intermediate regions of sharp bending in a glass sheet to be shaped to a complicated shape. In the past, electric heaters have been used in association with elongated areas to be bent sharply as is the case with the electric heaters 56 of the present apparatus. However, to the best of our knowledge, the use of auxiliary heaters radiating heat from a substantially circular area in conjunction with areas to be shaped to sharp elongated lines of bending in elongated areas extending transversely to the sheet have never been successfully accomplished in a single bending operation. The use of a sectionalized outline mold with tilted shaping frame sections of considerable width that extend in end-to-end relation completely around the entire perimeter of the outline mold when the latter is closed is another feature of this invention that makes possible the attainment of the complicated bend described herein. With the apparatus of this invention, the glass sheet slides relative to the tilted shaping surfaces of the outer ends of the end mold sections as the latter fold upward to help form the transversely extending areas of sharp bending where the glass is locally heated intensively to form the preliminary bend followed by the glass sheet being free to slide additionally with respect to the tilted shaping surfaces of the longitudinally extending mold rails 32 as well as those of the end mold sections 40 in response to additional localized heat applied from a circular area from the additional heating element to produce the additional substantially spherical sag in the central region of the glass.

The form of this invention shown and described in this disclosure represents an illustrative preferred embodiment thereof. It is understood that various changes may be made without departing from the gist of the invention as defined by the claimed subject matter that follows.

We claim:

1. Apparatus for shaping a glass sheet to a complex shape having sharply bent end portions and a substantially spherically bent central portion, comprising:
    an outline shaping frame having an upwardly facing shaping surface conforming in elevation and outline to the periphery of the bent glass sheet;
    first and second elongated heating elements supported above the shaping frame at an elevation above and closely adjacent to the elevation assumed by an unbent glass sheet loaded onto the shaping frame, and extending across respective end portions of the frame in alignment with the desired locations for the sharp bends; and
    a third heating element of extended area supported below the shaping frame at an elevation below and closely adjacent to the elevation assumed by the bent glass sheet, and aligned with a central portion of the area circumscribed by the shaping frame between the first and second heating elements.

2. Apparatus as in claim 1, further including independent means for actuating said first and second heating elements in unison and means for actuating said third heating element independent of said actuating means for said first and second heating elements.

3. Apparatus as in claim 1, wherein each of said first and second heating elements comprises a plurality of elongated electroconductive heating elements disposed side by side and supported by a refractory holder in an elongated area and said third heating element comprises an electroconductive heating element arranged in the form of a spirally wound coil supported by a ceramic holder of essentially circular configuration.

4. Apparatus as in claim 1, wherein said outline shaping frame is sectionalized.

5. Apparatus as in claim 4, wherein said sectionalized shaping frame comprises a series of elongated shaping rails, each of which has an upward facing surface of considerable longitudinal and transverse extent sloping downwardly and inwardly from its outer side to its inner side transversely of its length to provide a surface on which a portion of the glass sheet perimeter slides as it sags to said complex shape.

6. Apparatus as in claim 4, wherein said sectionalized outline shaping frame comprises a mold support structure including a central mold section comprising a pair of longitudinally extending shaping rails rigidly connected to said mold support structure and extending longitudinally along the opposite longitudinal sides of said shaping frame and having upward facing shaping surfaces sloping obliquely and downwardly inward transversely of their length, the central mold section flanked by a pair of end mold sections, each extending in plan outline to enclose the ends of said shaping frame and having upwardly facing shaping surfaces sloping obliquely and downwardly inward transversely of their length, means hingedly connecting each said end mold section to said mold support structure to permit said end mold sections to pivot outwardly to a spread mold position to support the ends of a flat glass sheet for bending, and means connected to each end mold section to pivot the latter into a closed mold position wherein said end mold sections are in end to end relation with the longitudinal ends of said longitudinally extending shaping rails of said center mold section to provide a substantially continuous shaping frame conforming in elevation and plan outline to the shape desired for the margin of the bent glass sheet and sloping obliquely and downwardly inwardly transversely of its length.

7. Apparatus as in claim 6, wherein each of said shaping rails and end rail sections is of a modified T construction in cross-section comprising a head portion sloped obliquely and downwardly inward transversely of its length and a stem portion connected to said mold support structure.

8. Apparatus as in claim 7, wherein each end mold section is provided with an arm pivotally attached to said mold support structure.

9. Apparatus for shaping a glass sheet within a hot atmosphere to a complicated shape comprising a pair of sharply bent areas extending across its transverse dimension and a substantially spherically sagged portion intermediate said pair of sharply bent areas comprising an outline mold comprising an upward facing shaping frame of outline configuration conforming in elevation and plan outline to said complicated shape comprising a mold support structure including a central mold section comprising a pair of longitudinally extending shaping rails rigidly connected to said mold support structure and extending longitudinally along the opposite longitudinal sides of said shaping frame and having upwardly facing, extended, planar shaping surfaces sloping obliquely and downwardly inward transversely of their length, the central mold section being flanked by a pair of end mold sections, each extending in plan outline to enclose the ends of said shaping frame and having upwardly facing, extended, planar shaping surfaces sloping obliquely and downwardly inward transversely of their length, means hingedly connecting each said end mold section to said mold support structure to permit said end mold sections to pivot outwardly to a spread mold position to support the ends of a flat glass sheet for bending, and means connected to each end mold section to pivot the latter into a closed mold position wherein said end mold sections are in end to end relation with the longitudinal ends of said longitudinally extending shaping rails of said center mold section to provide a substantially continuous shaping frame conforming in elevation and plan outline to the shape desired for the margin of the bent glass sheet and sloping obliquely and downwardly inwardly transversely of its length.

10. Apparatus as in claim 9, further including a first heating element disposed in facing relation to a glass sheet supported on said mold to face one of said areas to be sharply bent, a second heating element disposed to face the other of said areas to be sharply bent, and a third heating element of essentially circular area supported in position to face the central portion of said sheet intermediate said transversely extending areas to be sharply bent.

* * * * *